March 6, 1951  C. B. COOK  2,544,007
APPARATUS FOR STERILIZING CONTAINERS
Filed Feb. 24, 1945  2 Sheets-Sheet 2
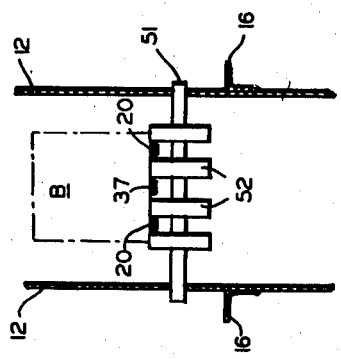
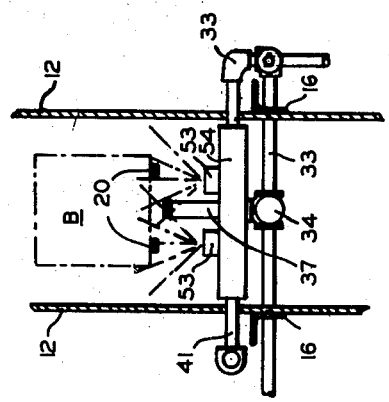
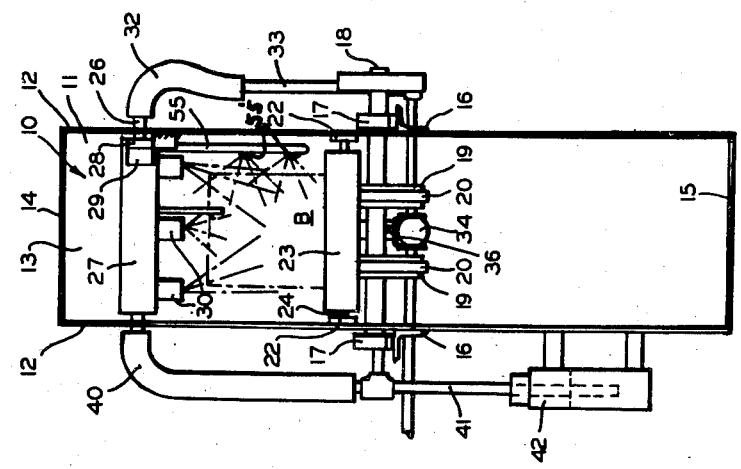
INVENTOR.
C. B. COOK
BY B. J. Craig,
ATTORNEY Patented Mar. 6, 1951

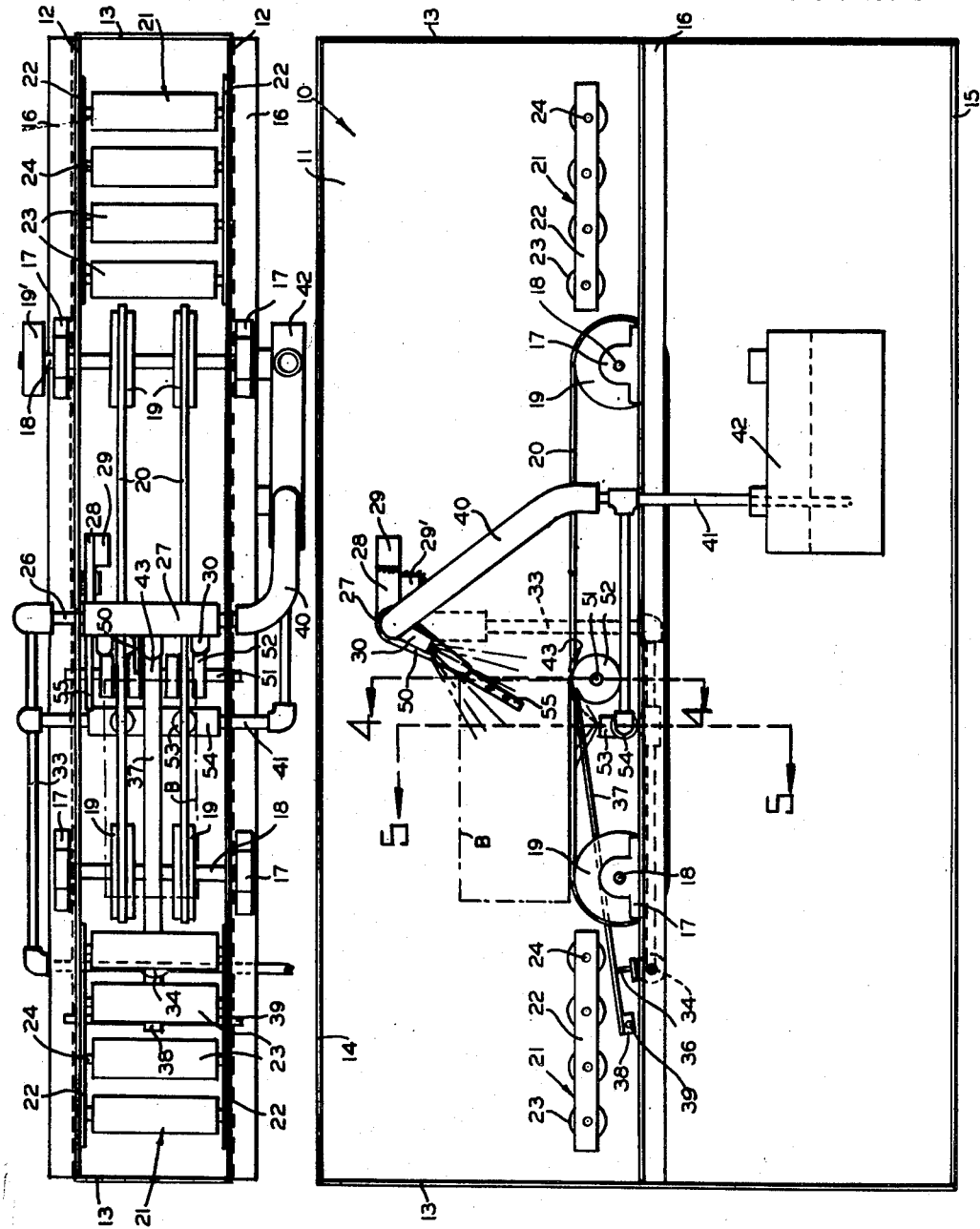

2,544,007

UNITED STATES PATENT OFFICE 2,544,007

APPARATUS FOR STERILIZING CONTAINERS

Charles B. Cook, Los Angeles, Calif.

Application February 24, 1945, Serial No. 579,673

7 Claims. (Cl. 21—80)

1

This invention relates to an apparatus for sterilizing containers.

The general object of the invention is to provide an improved apparatus for sterilizing containers by means of which all faces of the container being treated may be thoroughly drenched with an antiseptic or sterilizing solution.

A more specific object of the invention is to provide a box sterilizing apparatus including a housing having a conveyor therein and having a nozzle which is supplied with sterilizing material and wherein the nozzle is mounted to move to change the angle of discharge as a box passes in the path of the nozzle discharge.

A more specific object of the invention is to provide a box treating apparatus including a shiftable nozzle which is mounted so that it will be moved by a box to direct sterilizing material against and into a box as the latter passes on the conveyor.

Another object of the invention is to provide a novel pivoted support for the nozzle member of a box treating apparatus.

A further object of the invention is to provide a box treating apparatus including novel absorbent rollers which are adapted to engage a box.

Another object of the invention is to provide a box treating apparatus including opposed nozzle members and wherein one or more of the nozzle members are mounted to move during the passage of a box.

Other objects and the advantages of my invention will be apparent from the following description taken in connection with the accompanying drawings, wherein:

Fig. 1 is a side elevation showing a box treating apparatus embodying the features of my invention and with one side wall of the housing removed;

Fig. 2 is a top plan view of the apparatus with the top removed;

Fig. 3 is an end view with one end of the housing removed;

Fig. 4 is a sectional detail of the absorbent rollers taken on line 4—4, Fig. 1;

Fig. 5 is a sectional detail showing the fixed spray members and taken on line 5—5, Fig. 1, and Fig. 6 is an enlarged sectional detail showing the discharge nozzles.

Referring to the drawing by reference characters, I have shown my invention as embodied in an apparatus for sterilizing containers which is indicated generally as at 10. As shown, the device includes a housing 11 having sides 12 and ends 13. The housing includes a top 14 and a

2 bottom 15. Intermediate each side 12, upon the outer surface thereof, I arrange a longitudinally extending angle member 16.

Arranged upon the angle members 16, I provide spaced bearings 17 which support shafts 18 which extend through the sides 12. Each shaft 18 supports a pair of spaced sprockets 19 and these sprockets 19 in turn support endless box conveyors 20 which may be chains or belts. One of the shafts 18 is driven by means of a pulley 19'.

At each end of the endless conveyor 20 I arrange roller conveyors 21, each of which include side plates 22 mounted on the inner wall of the side 13. The side plates 22 support rollers 23 on shafts 24.

In operation a box B is placed or run upon one of the roller conveyors 21 (the one at the left in Fig. 1) and is moved towards the conveyor 20 until it is engaged by the conveyor and is conveyed forwardly. From the conveyor 20 the box then moves on to the other roller conveyor 21 remote from the first roller conveyor.

My apparatus is particularly adapted for use in sterilizing citrus packing house boxes to prevent spread of diseases, such as "mealy bug," from one orchard to another, although the apparatus is not limited to any such particular use.

In order to spray the boxes with sterilizing solution as they pass through the housing, I provide a shaft 26 which extends through holes in the sides 12 of the housing. The shaft 26 is in the nature of a pair of hollow tubes 26a and 26b which are free to rotate. Secured to the shaft I show a spray nozzle support 27 which includes an arm 28 which has a counterweight 29 thereon. The arm 28 is normally urged downwardly by the weight 29 to engage a stop 29' on one of the side walls.

The support 27 is provided with a plurality of nozzles 30. Each nozzle is provided with a discharge aperture which directs the sterilizing solution or insecticide material downwardly. As shown in Fig. 3, the nozzles have their outlets so disposed that the middle nozzle directs spray downwardly, while the outer nozzles direct their spray somewhat inwardly. The normal path of the spray material is also indicated in Figs. 1 and 3.

As shown the support 27 also supports a depending arm 55 which includes nozzles 55' which direct spray material as shown in Fig. 3.

The nozzles 30 and 55' may be of any suitable construction and their details form no part of the present invention.

In order to supply sterilizing solution to the nozzles 30 and 55' these nozzles are connected to the tubular shaft 26 which supports the member 27. The tube 26ª of the shaft 26 is connected by a flexible hose 32 with a pipe 33 which extends to a suitable source of compressed air. A pipe 33 affords communication between the tube 26ª and the nozzle. The pipe 33 extends through the housing and has a valve 34 therein disposed intermediate the conveyor 20. This valve 34 is normally closed and is adapted to be opened by downward pressure on a stem 36. In order to depress the stem 36 I provide an arm 37 which includes an end portion 38 through which a shaft 39 extends. The shaft 39 passes through holes in the side walls 12.

The tube 26ª of the shaft 26 is connected by a flexible hose 40 to a pipe 41 which extends into a tank 42 which contains sterilizing material. From the hose 40 the sterilizing material is conveyed through the tube 26ª and through a pipe 42ª to each nozzle.

Remote from the shaft 39 the arm 37 includes a curved end 43 which is adapted to be engaged by a box B on the conveyor 20, as shown in Fig. 1. In this position the arm 37 is depressed and the valve stem 36 has been moved to cause the valve 34 to be opened so that compressed air passes through the pipe 33 and into the tube 26ª whence it passes to the nozzles 30 and 55'. The nozzles are of the injector type and include an air outlet 49ª and a sterilizing solution outlet 49ᵇ and when the support 27 is in the position shown in Fig. 1 the nozzles direct the disinfecting material as indicated by the broken lines in the drawing. This causes the outer end of the face of the box to be drenched but does not thoroughly drench the inner face of the box end and to accomplish this drenching of the inner face I provide the support 27 with an arm 50. This arm 50 extends into the path of the box and when the parts are in the position shown in Fig. 1, the arm which has just been engaged by the box as the box moves forward will move and will rock the support 27 and the nozzles so that the nozzles move from the position shown in Fig. 1 and thus change the angle of discharge. The spray nozzle support 27 is normally held in the position shown in Fig. 1 by the counterweight 29 and in this position of the support 27 the nozzles 30 are inclined towards an approaching box as shown in Fig. 1.

In this position the valve control arm 37 will have been moved to open the valve 36. Thus the outer face of the leading end of the box will be drenched. As the advancing box engages and rocks the arm 50 the support 27 will be rocked and the nozzles 30 carried thereby will have their angle of discharge shifted so that these nozzles will direct sterilizing material into and against the inner face of the leading end of the box to thoroughly drench this face.

As soon as the leading end of the box passes the arm 50 the latter will drop, causing the support 27 to rotate and the inner face of the trailing end of the box will then be drenched, after which the outer face of the trailing end of the box will be drenched.

In order that the lower surface of the box may be thoroughly treated with the spray material, I provide a shaft 51 which is supported in holes in the sides 12. This shaft 51 is provided with a plurality of spaced rollers 52. These rollers are in the nature of soft pad-like members and may be made of an absorbent such as felt, sponge rubber, et cetera. The rollers 52 are maintained in wet condition by the sterilizing material which is discharged from the nozzles 30 and as the box passes over the rollers the latter engage the lower surface of the box and discharge disinfecting material against the box surface. The rollers 52 are spaced to permit the conveyors 20 to pass and to permit the arm 37 to move.

Adjacent to the rollers 52 and opposed to the nozzles 30, I show a pair of nozzles 53 which are mounted on a tube 54 which supplies them with sterilizing material. The nozzles 53 are disposed to direct insecticide against the bottom of the box. The tube 54 is suitably connected to the pipe 33 and to the pipe 41.

The various pipes may include suitable valves for adjustment and control of the spraying operation.

From the foregoing description it will be apparent that I have invented a novel apparatus for sterilizing containers which is simple in construction and operation and which is not likely to get out of order.

Having thus described my invention, I claim:

1. In an apparatus for spraying boxes with disinfectant fluid, a conveyor adapted to carry boxes to be treated, a nozzle support, a pivotal mounting for the nozzle support, the nozzle being directed towards a box approaching on the conveyor, an arm on the nozzle support and movable to shift the support, means controlled by a box on the conveyor to move the arm to thereby cause the nozzle support to change its position with respect to the box to cause the nozzle to spray from another angle, and means to conduct fluid to the nozzle.

2. In an apparatus for spraying boxes with disinfectant fluid, a conveyor adapted to carry boxes to be treated, a nozzle, means to shiftably support said nozzle, means normally causing the nozzle to be directed towards the outer face of the leading end of a box approaching on the conveyor, trip means disposed in the path of a box on the conveyor and operable by a box to cause the nozzle to drench the inner face of the leading end of the box, said trip means returning to normal position after being disengaged from a passing box, and means to conduct fluid to the nozzle.

3. In an apparatus for spraying boxes with disinfectant fluid, said apparatus including a body, a conveyor mounted on the body and adapted to carry boxes to be treated, a nozzle, means to shiftably mount said nozzle on the body, means normally causing the nozzle to be directed towards the outer face of the leading end of a box approaching on the conveyor, a trip arm disposed in the path of the leading edge of a box on the conveyor and operable by a box to cause the nozzle to drench the inner face of the leading end of the box, said trip arm returning to normal position after being disengaged from the leading end of a passing box, the trip arm thereafter engaging the trailing end of a box to cause such trailing end to be drenched, and means to conduct fluid to the nozzle.

4. In an apparatus for spraying boxes with disinfectant fluid, said apparatus including a body, a conveyor mounted on the body and adapted to carry boxes to be treated, a spraying nozzle support, means to pivotally mount said spraying support on the body, spaced nozzles on said pivoted nozzle support, means normally holding the nozzle support so that the nozzles are directed towards the outer face of the leading end of a box approaching on the conveyor, a trip arm carried by the nozzle support and disposed in the path of a box on the conveyor and engageable by the leading end of a box to swing the nozzle support about its axis to cause the nozzles to drench the inner face of the leading end of the box, said holding means returning the nozzle to normal position after being disengaged from the leading end of a passing box, the trip arm thereafter engaging the trailing end of a box to cause such trailing end to be drenched, and means to conduct fluid to the nozzles.

5. In an apparatus for spraying boxes with disinfectant fluid, said apparatus including a body, a conveyor mounted on the body and adapted to carry boxes to be treated, a nozzle support, means to pivotally mount said support on the body, spaced nozzles on said pivoted nozzle support, means normally holding the nozzle support so that the nozzles are directed towards the outer face of the leading end of a box approaching on the conveyor, a trip arm carried by the nozzle support and disposed in the path of a box on the conveyor and engageable by the leading end of a box to swing the nozzle support about its axis to cause the nozzles to drench the inner face of the leading end of the box, said holding means returning the nozzles to normal position after being disengaged from the leading end of a passing box, the trip arm thereafter engaging the trailing end of a box to cause such trailing end to be drenched, means to supply fluid to the nozzles, a liquid absorbent roller mounted adjacent to said conveyor and adapted to engage one face of a box on the conveyor, and other nozzles directed at an angle to the first nozzles and communicating with said supply means and directed towards the sides of a box on the conveyor.

6. In an apparatus for spraying boxes with disinfectant fluid, said apparatus including a body, a conveyor mounted on the body and adapted to carry boxes to be treated, a spraying nozzle support, means to pivotally mount said spraying support on the body, spaced nozzles on said pivoted nozzle support, means normally holding the nozzle support so that the nozzles are directed towards the outer face of the leading end of a box approaching on the conveyor, a trip arm carried by the nozzle support and disposed in the path of a box on the conveyor and engageable by the leading end of a box to swing the nozzle support about its axis to cause the nozzles to drench the inner face of the leading end of the box, said holding means returning the nozzle support to normal position after being disengaged from the leading end of a passing box, the trip arm thereafter engaging the trailing end of a box to cause such trailing end to be drenched, means to supply fluid to the nozzles, said means including a normally closed valve, a pivoted arm, and means whereby the pivoted arm opens the valve, said pivoted arm including a portion engageable by a box when the box moves into the vicinity of the spraying nozzles to actuate the valve to open position.

7. In an apparatus for spraying boxes with disinfectant fluid, said apparatus including a body, a conveyor mounted on the body and adapted to carry boxes to be treated, a spraying nozzle support, means to pivotally mount said spraying support on the body, spaced nozzles on said pivoted nozzle support, means normally holding the nozzle support so that the nozzles are directed towards the outer face of the leading end of a box approaching on the conveyor, a trip arm carried by the nozzle support and disposed in the path of a box on the conveyor and engageable by the leading end of a box to swing the nozzle support about its axis to cause the nozzles to drench the inner face of the leading end of the box, said holding means returning the nozzle support to normal position after being disengaged from the leading end of a passing box, the trip arm thereafter engaging the trailing end of a box to cause such trailing end to be drenched, means to supply fluid to the nozzles, said means including a normally closed valve for controlling passage of disinfectant fluid, a pivoted arm, means whereby the pivoted arm opens the valve, said pivoted arm including a portion engageable by a box when the box moves into the vicinity of the spraying nozzles to actuate the valve to open position, a fluid absorbent roller mounted adjacent to said conveyor and adapted to engage one face of a box on the conveyor, other nozzles remote from said first nozzles and directed towards a box on the conveyor, and means to supply sterilizing fluid to said other nozzles.

CHARLES B. COOK.

REFERENCES CITED

The following references are of record in the file of this patent:

UNITED STATES PATENTS

| Number | Name | Date |
|---|---|---|
| 880,713 | Blair | Mar. 3, 1908 |
| 1,853,335 | Cook | Apr. 12, 1932 |
| 2,373,432 | Tanner | Apr. 10, 1945 |
| 2,461,657 | Paasche | Feb. 15, 1949 |